(No Model.) 3 Sheets—Sheet 3.
J. C. HEGELEIN.
PHOTOGRAPHIC CAMERA.
No. 524,142. Patented Aug. 7, 1894.
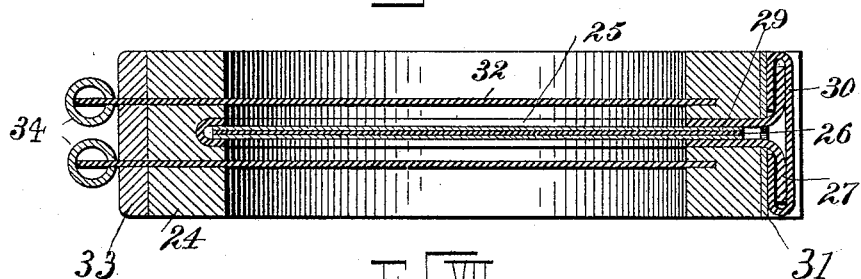
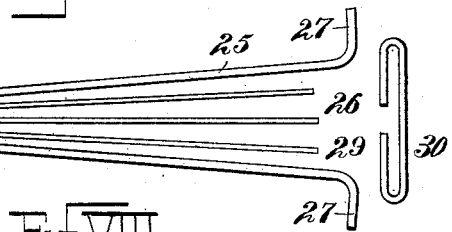
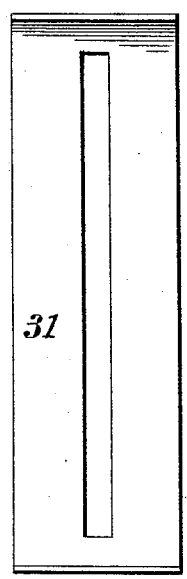
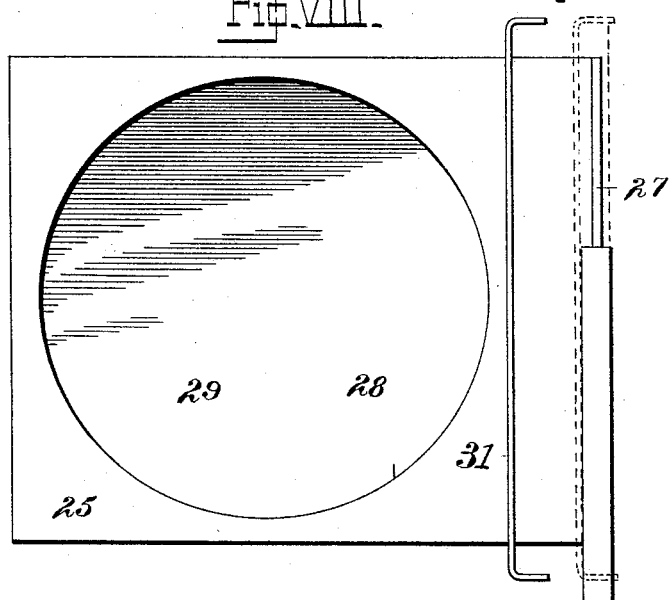
Witnesses
Wm H. Courtland.
Geo. W. Naylor Jr.
Inventor
John C. Hegelein
By Wilmer & Frinn
Attys.

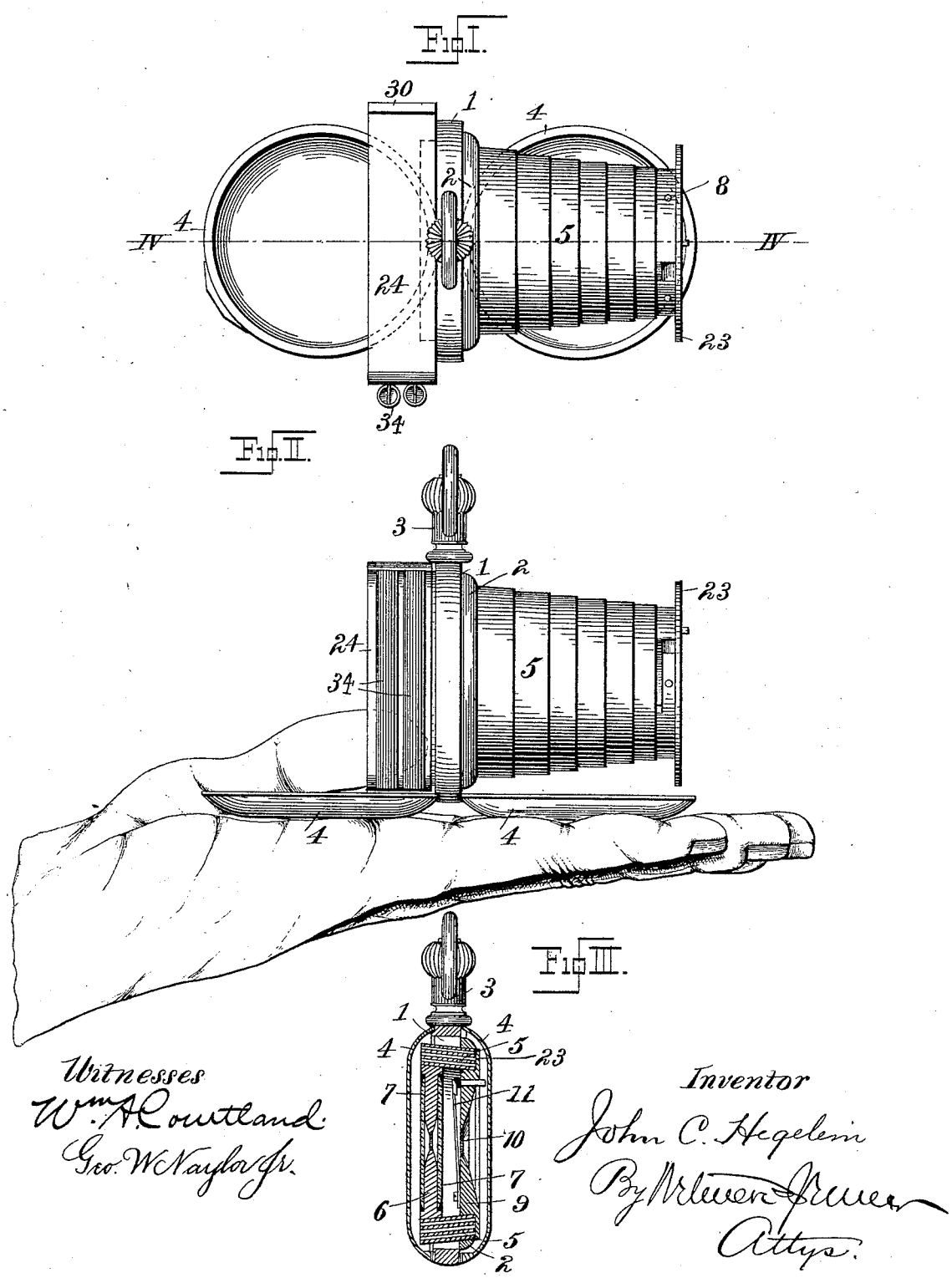

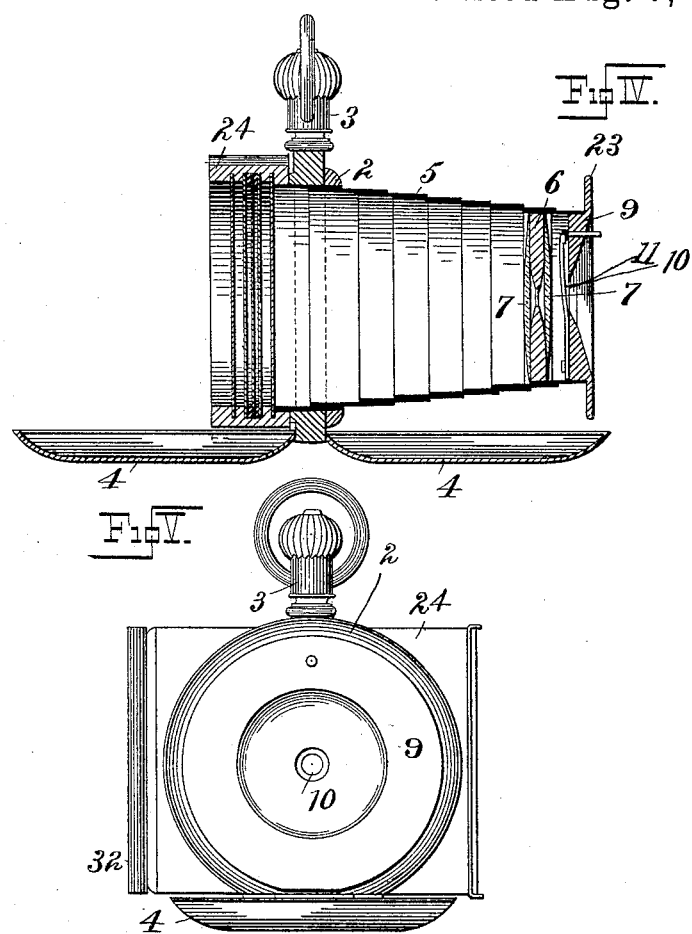

UNITED STATES PATENT OFFICE.

JOHN C. HEGELEIN, OF NEW YORK, N. Y.

PHOTOGRAPHIC CAMERA.

SPECIFICATION forming part of Letters Patent No. 524,142, dated August 7, 1894.

Application filed December 2, 1893. Serial No. 492,591. (No model.)

*To all whom it may concern:*

Be it known that I, JOHN C. HEGELEIN, a citizen of the United States, residing in the city, county, and State of New York, have invented certain new and useful Improvements in Photographic Cameras, of which the following is a specification.

My invention relates particularly to cameras of smaller size than those used ordinarily and I have had in view the production of an efficient camera which can be carried in the vest pocket. Thus my improvements look to the simplifying of the parts of the instrument and the adoption of such instrumentalities in its make as are susceptible of compression within a very small space.

I will first describe the invention with reference to the accompanying drawings and then point out in the claims the novel features.

In said figures: Figure I is a top view of my improved camera with plate holder attached. Fig. II is a side elevation of the same. Fig. III is a sectional view of the camera in its case closed up. Fig. IV is a sectional view of the camera and plate holder taken on the line IV—IV, Fig. I. Fig. V is a front view of the instrument. (The remaining figures are to an enlarged scale.) Fig. VI is a longitudinal sectional view of a plate holder. Fig. VII is an edge view of the film supporting plate of said plate holder, the parts being shown detached and two films being shown in place. Fig. VIII is a face view of the same. Fig. IX is an elevation of the inner side of the clamp plate.

The main part of the camera is preferably made of such shape and size as to be contained within an ordinary watch case. I may construct the case especially for containing my camera or I may take an ordinary watch case and remove the inner back and crystal leaving the center 1, the bezel 2, pendant 3 and the front and rear covers 4. Within the center I fix the outermost and largest ring of a telescopic box or casing 5, the rear end of such ring projecting beyond the rear of the center far enough to afford an angular seat for the plate holder. Any number of rings may be employed to make up the telescopic casing 5. Usually thin metal is employed for the purpose; I have shown in Figs. I, II and IV eight rings composing the said casing; in Fig. III however the number is reduced to four for the sake of clearness of representation. In the smallest ring of the casing 5 is fixed the diaphragm 6 on each side of which are arranged the photographic lenses 7, 7. To the same ring is attached by pins or screws 8 or otherwise, the front plate 9 of the camera which has at center the usual aperture 10 for the admission of light to the lenses. The shutter 11 is pivoted to this front plate and is of simple form. It is more fully shown and described in my application filed March 20, 1894, Serial No. 504,370, forming a division of this case.

The front plate 9 has a flange 23 which when the instrument is closed up as shown in Fig. III covers the edges of the rings 5, assists in holding the instrument compactly together and prevents rattling.

The plate holder consists of a box or frame 24 of wood into which the film supporting plate is slipped from one end and the slides from the other end as shown in Fig. VI. The film supporting plate is shown in Figs. VII and VIII. It consists of a sheet 25 of metal bent in V-shape as shown in Fig. VII leaving space between for the insertion of a dark diaphragm 26 on each side of which may be placed a film 29. The film supporting plate 25 has its edges bent out in the form of a flange 27 and has the apertures shown at 28 corresponding with those in the plate holder. When the films are in place as shown in Fig. VII, the two parts of plate 25 are pressed together with the fingers and a C-shaped clamp 30 is slipped endwise over the flange 27 as shown in full lines in Fig. VIII. A slotted clamp plate 31 is then slipped over the end of the V-plate 25 and forced down to the position shown in dotted lines in Fig. VIII, thus holding the clamp 30 in place. When therefore the film supporting plate is placed in the plate holder as shown in Fig. VI, the clamp 31 is held down to its proper position and so all the parts are firmly clamped together. The slides 32 are then inserted on each side of the film holding plate at the opposite end of the plate holder from the film holding plate as shown in Fig. VI. The slides 32 have their outer edges provided with beads 34 by which they can be withdrawn from the plate holder and which seat against the velvet or other cushion 33 on the edge of the plate holder to make a light-tight joint.

The operator can carry several of the plate holders with the films in them in his pockets and can carry in his vest pocket the camera in its case folded up as shown in Fig. III and when he wishes to take a photograph it is an easy matter to open the case, pull out the camera in the position shown in Figs. I, II and IV, place one of the plate holders in position as shown in said figures and proceed to take the picture.

Having thus described my invention, the following is what I claim as new therein and desire to secure by Letters Patent:

1. In a pocket camera, the combination of the frame 2 having covers 4, a casing 5 made up of independent tapering rings, the largest ring projecting beyond the frame 2 and adapted to fit an aperture in a plate-holder, and a front plate, shutter and lens carried by the smallest ring of said casing, substantially as set forth.

2. A plate holder consisting of frame 24, opaque diaphragm 26, film holder 25 having flanges 27 and C-shaped clamp 30 arranged and adapted to operate, substantially as set forth.

3. In a plate holder, the combination of the frame 24, the opaque diaphragm 26, the film holder 25 having flanges 27, the clamp 30 embracing said flanges and the clamp holder 31, all arranged and adapted to operate substantially as set forth.

4. In a plate holder, the combination of the frame 24, the film holder consisting of plates 26, 25 and clamps 30, 31 adapted to enter said frame from one end and the slides 32, 32 adapted to enter said frame from the other end, substantially as set forth.

5. The combination of the casing 5 made up of independent tapering rings and the front plate 9 having flange 23 covering up the rings when the camera is closed and arranged and adapted to operate substantially as set forth.

JOHN C. HEGELEIN.

Witnesses:
PERCY THORPE,
R. EMMET DOHERTY.